United States Patent [19]

Rolniczak et al.

[11] 4,304,543

[45] Dec. 8, 1981

[54] APPARATUS FOR THE MANUFACTURE OF HOLLOW BODIES

[75] Inventors: Heinz Rolniczak, Hennef; Peter Klüsener, Bonn-Bad Godesberg, both of Fed. Rep. of Germany

[73] Assignee: Kautex-Werke Reinold Hagen GmbH, Bonn-Holzbar, Fed. Rep. of Germany

[21] Appl. No.: 133,780

[22] Filed: Mar. 26, 1980

Related U.S. Application Data

[63] Continuation of Ser. No. 784,988, Apr. 6, 1977, abandoned, which is a continuation of Ser. No. 659,752, Feb. 20, 1976, abandoned.

[30] Foreign Application Priority Data

Apr. 19, 1972 [DE] Fed. Rep. of Germany ....... 2218852

[51] Int. Cl.³ ............................................. B29C 17/07
[52] U.S. Cl. ................... 425/532; 264/542; 425/534
[58] Field of Search ................. 425/532, 534; 264/542

[56] References Cited

U.S. PATENT DOCUMENTS

| | | | |
|---|---|---|---|
| 3,583,031 | 6/1971 | Kader et al. ................... | 425/534 X |
| 3,940,225 | 2/1976 | Uhlig ............................. | 425/532 X |
| 3,954,373 | 5/1976 | Rolniczak et al. .................. | 425/534 |

*Primary Examiner*—Jan H. Silbaugh
*Attorney, Agent, or Firm*—Edwin E. Greigg

[57] ABSTRACT

A moulding apparatus having a two-part mould movable between a receiving station at which thermoplastics synthetic material is extruded into the mould and a release station at which a moulded hollow body is removed from the mould. This hollow body is then supported by a blowing and calibrating member before being gripped by a two-part gripper which moves the body from the release station to a transfer station in synchronism with the mould movement. The gripper parts are mounted on arms or levers supporting and/or guiding the mould parts.

16 Claims, 9 Drawing Figures

APPARATUS FOR THE MANUFACTURE OF HOLLOW BODIES

This is a Continuation, of application Ser. No. 784,988, filed Apr. 6, 1977 now abandoned. This is continuation of application Ser. No. 659,752, filed Feb. 20, 1976, and now abandoned.

The invention relates to an apparatus for the manufacture of hollow bodies, in particular bottles, containers or the like, from thermoplastics synthetic material by the blow-moulding method, the apparatus comprising a hollow mould in two or more parts movable to and fro between a receiving station associated with the extrusion nozzle of an extruder and a mould release station at which the hollow body is removed from the hollow mould and a holder supporting the hollow body after opening of the hollow mould, which holder may be constructed as a blowing and calibrating pin or member, a gripper being associated with the components supporting the halves of the hollow mould for transferring the hollow body to subsequent apparatus, the arrangement being such that during movement of the hollow mould between the receiving station and the mould release station, the gripper is correspondingly movable between the mould release station and a transfer station.

It is an object of the invention, inter alia, to provide such apparatus which may be readily adapted to specific constructional or other requirements, which may be determined, for example, by the shape of the hollow bodies to be produced, by the method of operation, or the like. To achieve this object there should be as few drive members as possible. Furthermore, the sequence of operations of the apparatus should not be delayed or otherwise impaired by the presence of the gripper. In addition, despite at least one common drive for the hollow mould and gripper, it is desired to be able to select the path of motion of the latter and, if necessary, also the extend of the movements independently of that of the hollow mould.

To fulfil this object, the invention firstly proposes that the gripper parts are attached to arms, which support and/or guide the halves of the hollow mould and which may be constructed as levers. The grippers parts may also be attached to arms serving for guiding the halves of the hollow mould in parallel. The invention also provides the possibility of mounting the gripper parts both on the arms supporting and/or guiding the halves of the hollow mould as well as on the arms serving for guiding them in parallel.

If the gripper parts are only supported by one arm or lever, it is appropriate or even necessary to secure them rigidly to these arms or levers. However, this rigid mounting must not exclude the possibility of adjustment to different sizes or shapes of the hollow body. On the other hand, there is the possibility of mounting the gripper parts pivotably or adjustably on the arms supporting them, which arms may also moreover simultaneously support the halves of the hollow mould.

The possibility also exists that the gripper parts are supported by separate arms or levers, which are connected by additional arms or levers to the components supporting the parts of the hollow mould. These separate arms or levers may have a common pivot point. In this case also the basic advantage is ensured that the same drive may be used for the hollow mould and grippers.

Another object of the invention is concerned with the reciprocating motion between the receiving station and mould release station, the gripper parts being connected to the holder transmitting the corresponding movement to the hollow mould. It is possible but not essential to make this connection rigid. The possibility also exists of providing separate, preferably linear guides for the gripper parts. In this case, the arrangement may be such that the gripper parts or the components supporting them are pivotably connected to the holders transmitting the reciprocating motion between the receiving station and mould release station to the hollow mould. This may take place, for example, by means of rods, fish plates or the like, which are pivotably mounted both on the holder for the hollow mould as well as to the gripper parts or components supporting them. The essential advantage of an arrangement of this type consists in that the hollow body, on the one hand, and gripper, on the other hand, carry out the reciprocating motion simultaneously. However, the paths of movement of both parts do not have to be absolutely the same. On the contrary, it is possible to make the path of movement of the gripper, for example, shorter than that of the hollow mould so that, if need be, the space required for the entire arrangement becomes less. The same is true, for example, as regards the over all height of the entire arrangement. It is conceivable that the movement of the hollow mould between the two stations contains a vertical components, which must also be present in the case of the grippers when there is a direct connection of the gripper parts or the components supporting them to the hollow mould. This may be avoided by the aforementioned construction of the parts-pivotal connection between the holder for the hollow mould on the one hand and gripper parts on the other hand.

As regards their opening and closing movement, the gripper parts may be connected to the halves of the hollow mould or to the parts supporting them or connecting them. However, the possibility also exists of allocating an additional drive to the gripper parts for the opening and closing movements, for example, in the form of a pneumatic or hydraulic cylinder. In this case, the drive for the reciprocating motion between the two stations is derived from the hollow mould or the holder supporting it.

Another possibility for the transmission of the opening and closing movements to the gripper parts consists in providing one or more cranks for the latter, projections of the gripper parts or the components supporting them engaging said cranks.

According to a further aspect of the invention, stops may be provided in the region of the end positions of the gripper parts, which stops co-operate with swingably mounted control parts associated with the gripper parts, which control parts move the gripper parts into the open or closed position depending on the sequence of movement between both stations. Thus, the gripper parts may be connected by elbow levers to holders supporting the former, one of the levers being respectively connected to a control part actuated by the stop. In this case also a separate drive is not necessary either for the reciprocating movements not for the opening and closing movements of the gripper parts. On the contrary, all movements of the latter are derived from the drive of the hollow mould or halves of the hollow mould.

Embodiments of the present invention will now be described, by way of example, with reference to the accompanying drawings, in which.

The embodiments illustrated in the drawings are further developments of the apparatus according to U.S. Pat. Nos. 3,583,031 and 3,849,049.

Figure 1:
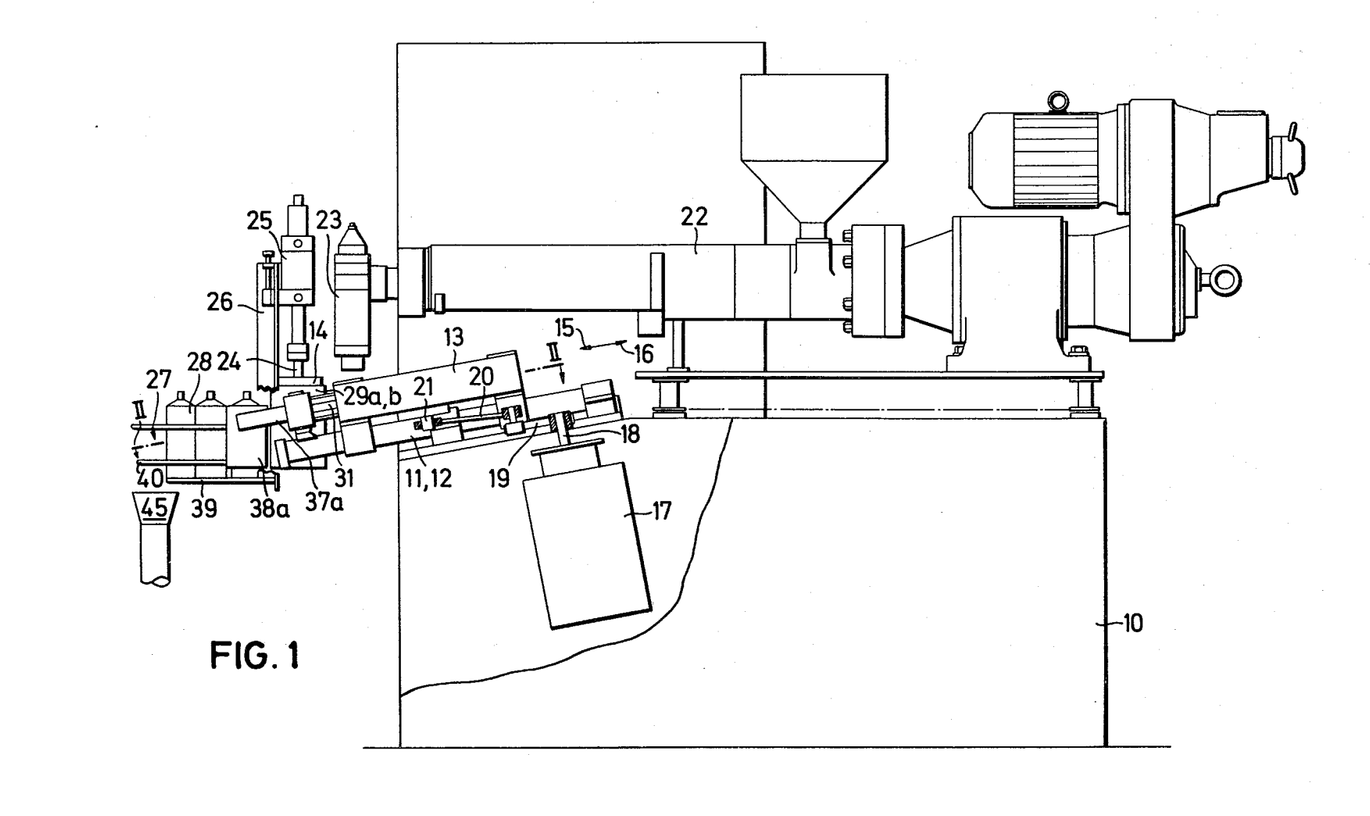
FIG. 1 is a side view of an apparatus for manufacturing hollow bodies of thermoplastics synthetic material by the blowing method and showing the hollow mould in the mould release station.
Figure 2:
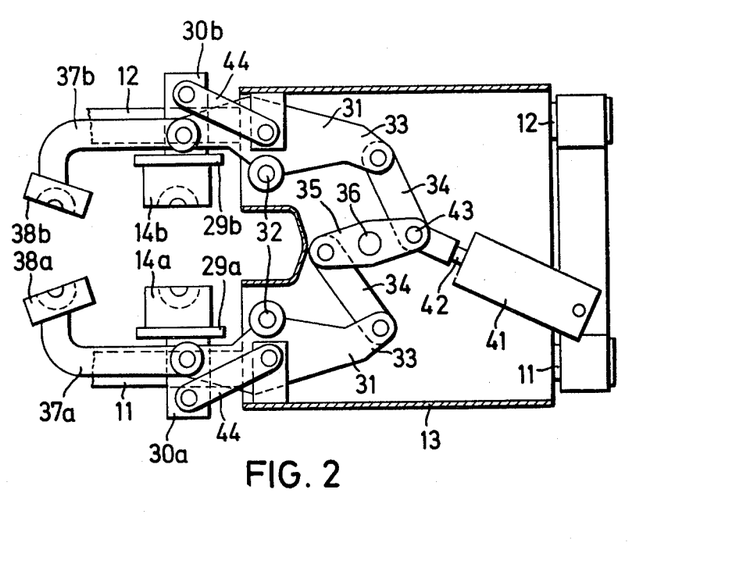
FIG. 2 is a section on line II—II of FIG. 1, but with the hollow mould located in the receiving station.

In the embodiment according to FIGS. 1 and 2, two rods 11, 12 are mounted on a machine frame 10, on which rods a carriage 13 is guided to move backwards and forwards. A hollow mould 14 is located on the front end of this carriage 13 with the interposition of means to be described, which hollow mould consists of two halves 14a, 14b. The reciprocating movement of the carriage 13 in the direction of arrows 15, 16 is effected by a brake motor 17, the shaft 18 of which is connected to the carriage 13 by a crank 19 and a connecting rod, which engages a pin 21 on the carriage 13. However, other drive means may be used for the carriage, for example a drive roller.

The machine frame 10 also supports an extruder 22, which is provided with a reversing extrusion head 23. Mounted in front of the latter is a blowing and calibrating member 24, which may be moved up and down by means of a piston guided in a cylinder 25. The cylinder 25 is supported by a platform 26, which may simultaneously serve as a holder for any additional apparatus. A conveyor path 27 is located on the platform 26, which conveyor path receives the finished hollow bodies 28 and transports them away after they have been removed from the hollow mould 14.

The platform 26 is, in turn, supported by the two rods 11, 12. The two mould halves 14a, 14b are secured to clamping plates 29a, 29b, each of which is provided externally with a projection 30a, 30b. A double-armed lever 31 is pivotally secured to or pivotably mounted on each of the two projections 30a, 30b, the axis of rotation passing at right angles to the plane in which the carriage 13 moves to and fro. The double-armed levers 31 are pivotally mounted on pivot pins 32 on the carriage 13. One arm 33 of each lever 31 is pivotally connected to the end of an intermediate lever 34. The two other ends of this intermediate lever 34 are pivotally connected to a common drive lever 35, which is pivoted at 35 on the carriage 13. This pivot pin 36 may extend into the pin 21 with which the connecting rod 20 of the brake motor 17 engages.

The levers 31 supporting the clamping plates 29a, 29b and thus the mould halves 14a, 14b are provided with extensions 37a, 37b extending beyond the projections 30a, 30b, which extensions, at their free ends, support parts 38a, 38b, together forming a gripper. The arrangement is such that when the hollow mould is located below the blowing member 24 according to FIG. 1, the gripper 38a, 38b extends into the end of the conveyor path 27 (transfer station) adjacent the hollow mould 14. The conveyor path consists of two adjacent strips 39, the upper surfaces of which serve to support the hollow bodies, and of lateral guide rods 40 or the like.

Also associated with the carriage 13 is a pneumatic cylinder 41, whose piston engages via its piston rod a joint bolt 43 to which is connected one of the two intermediate levers 34 and the drive lever 35. Actuation of the piston in its cylinder 41 results in a closing or opening movement of the arms of the levers 31 supporting the mould halves 14a, 14b and the gripper parts 38a, 38b through the intermediary of the levers 35 and 34. The two halves 14a and 14b of the hollow mould and the gripper parts 38a, 38b are also moved.

Additional levers 44 are provided for guiding the halves of the hollow mould 14a, 14b in parallel, which levers 44 are each pivotally connected at both their ends to the corresponding projection 30a, 30b and to the carriage 13.

The apparatus illustrated in FIGS. 1 and 2 of the drawing operates such that a pre-form is extruded from the extrusion head 23 preferably continuously, which pre-form is received by the hollow mould 14. The latter is thus located below the extrusion head 23 in the receiving station due to the carriage 13 with the hollow mould 14 having previously been moved in the direction of arrow 16 into the right hand end position. The hollow mould 14 is thus opened. Both halves 14a, 14b, of the hollow mould are separated and assume the position shown in FIG. 2. The hollow mould 14 is then closed around the pre-form, which is preferably tubular, hanging from the reversing extrusion head 23, as soon as the latter has the necessary length and is then moved in the direction of arrow 15 into the second end position illustrated in FIG. 1 of the drawings, in which it is located in the station below the cylinder 25 and the associated blowing and calibrating member 24, which at this time assumes its upper end position. Then, i.e. after the arrival of the hollow mould at the station below the blowing and calibrating member 24 (mould release station), the latter is moved downwards, its free end being inserted, in customary manner, into the upper end of the tubular section located in the hollow mould. Then and/or thereafter, the expansion of the pre-form takes place by supplying a pressure medium through the member. After adequate cooling of the hollow body thus produced in the hollow mould, the hollow mould 14 is opened by separating the two halves 14a, 14b of the mould and is returned towards the right, i.e. in the direction of arrow 16, to the receiving station. The previously produced hollow body is now suspended from the blowing and calibrating member 24, which projections from above into the opening, i.e., for example, into the bottle neck of the hollow body.

The gripper parts 38a, 38b are now placed around the hollow body suspended from the pin 24 in the mould release station and grip the latter, when the hollow body located in the receiving station is closed around the pre-form suspended from the extrusion head 23 due to pivoting of the levers 31 and closure of the halves 14a, 14b of the hollow mould effected by this movement. When the closing operation is completed, if the hollow body is held by the grippers 38a, 38b, the pin 24 is removed in an upwards direction from the hollow body. Consequently, at the time of the subsequent movement of the hollow mould 14 in the direction of arrow 15 from the receiving station to the mould release station and of the gripper 38a, 38b from the mould release station to the transfer station at the beginning of the conveyor path 27, the hollow body 28 is carried along by the gripper 38a, 38b and transferred to the conveyor path 27, the forward movement along this conveyor path 27 being effected by means of the hollow bodies inserted one after the other by the grippers 38a, 38b into the conveyor path 27. At the left hand end of the conveyor path 27, and located therebelow, is a pipe 45 (FIG. 1), which receives the hollow bodies falling downwards from the conveyor path 27 and delivers them to any subsequent stations.

Since the gripper parts 38a, 38b are rigidly mounted on the extensions 37a, 37b of the levers 31, they have a different movement to the two halves 14a, 14b of the hollow mould, in which the levers 44 have a parallel guiding action. Compared with this, during the opening and closing movements, the two grippers parts 38a, 38b are tilted towards each other.

Figure 3:
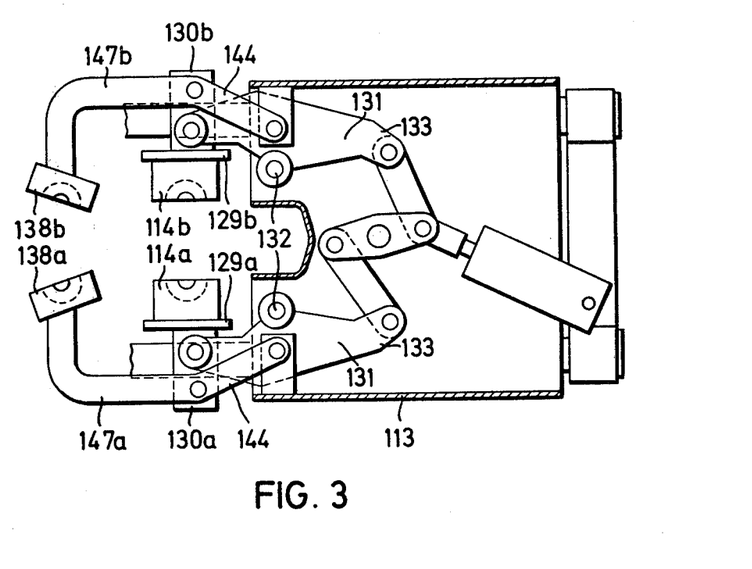
FIGS. 3 to 9 show further embodiments corresponding to FIG. 2.

The latter is also true for the embodiment according to FIG. 3, which has the essential parts of the embodiment according to FIGS. 1 and 2. The gripper parts 138a, 138b are supported by extensions 147a, 147b of the levers 144 serving to guide the halves 114a, 114b of the hollow moulds in parallel. The transmission of movements carried out by the hollow mould halves 114a, 114b to the gripper parts 138a, 138b, is thus through the projections 130a, 130b, of the clamping plates 129a, 129b.

Figure 4:
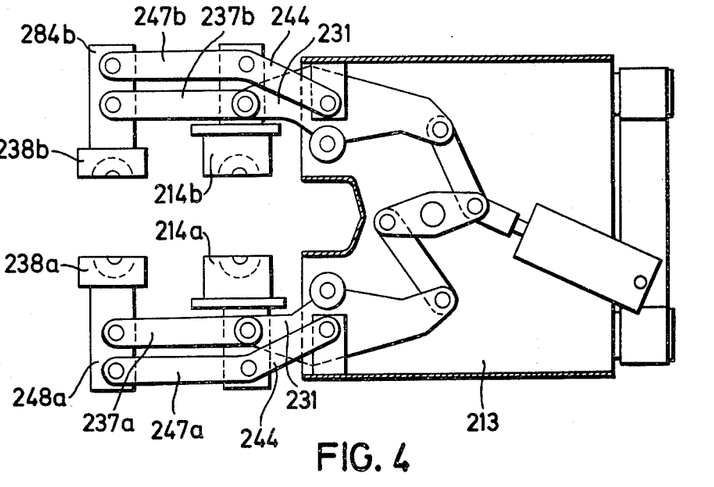

In the embodiment according to FIG. 4, both the levers 231 transmitting the opening and closing movements as well as the levers 244 serving to guide in parallel are provided with extensions 237a, 237b or 247a, 247b and the two gripper parts 238a, 238b, like the hollow mould halves 214a, 214b are provided with projections 248a, 248b, on which the aforementioned extensions pivotable engage. This construction has the result that, in the course of the opening and closing movements, even the gripper parts 238a, 238b retain a position in which they are parallel to each other, these movements however, occuring on a larger radius than those of the two hollow mould halves 214a, 214b so that the opening angle of the two gripper parts 238a, 238b is also greater than that of the two hollow mould halves 214a, 214b. In this case also, like the two earlier embodiments, the same support and drive members are provided for the hollow mould halves and gripper parts.

Figure 5:
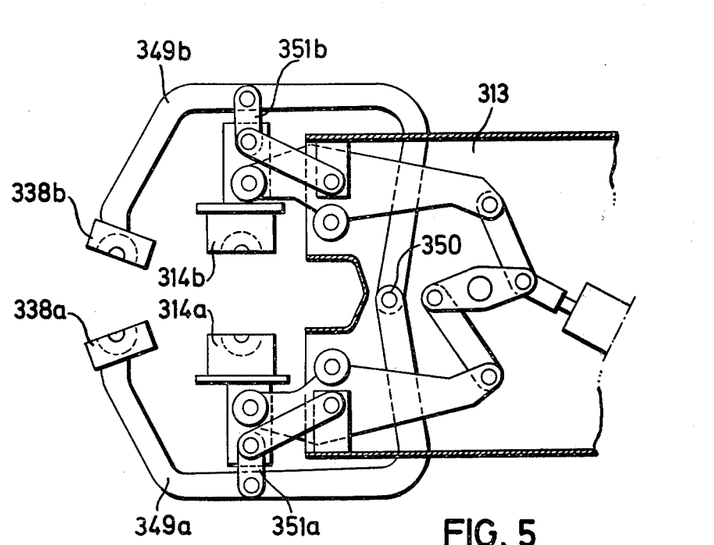

The gripper parts 338a, 338b of the embodiment according to FIG. 5 are supported by separate arms 349a, 349b, the connection between these arms and the gripper parts being rigid. The arms 349a, 349b have a common pivot point 350, which is located on the carriage 313. The actuating and guide means for the two hollow mould halves 314a and 314b correspond to those of the embodiment according to FIGS. 1 and 2 with the exception of the extensions 37a, 37b of the double-armed levers 31. Moreover, in the embodiment according to FIG. 5, guide members 351a, 351b are provided between the arms 349a, 349b and the hollow mould halves 314a, 314b or the parts supporting them and by which the opening and closing movements are transmitted to the gripper parts 338a, 338b. During the opening and closing movements the latter are tilted towards each other, whereas the mould halves, as in the other embodiments, retain their position parallel to each other. Although separate arms are provided for the gripper parts 338a, 338b, here again only one drive is necessary both for the hollow mould halves and for the gripper parts.

Figure 6:
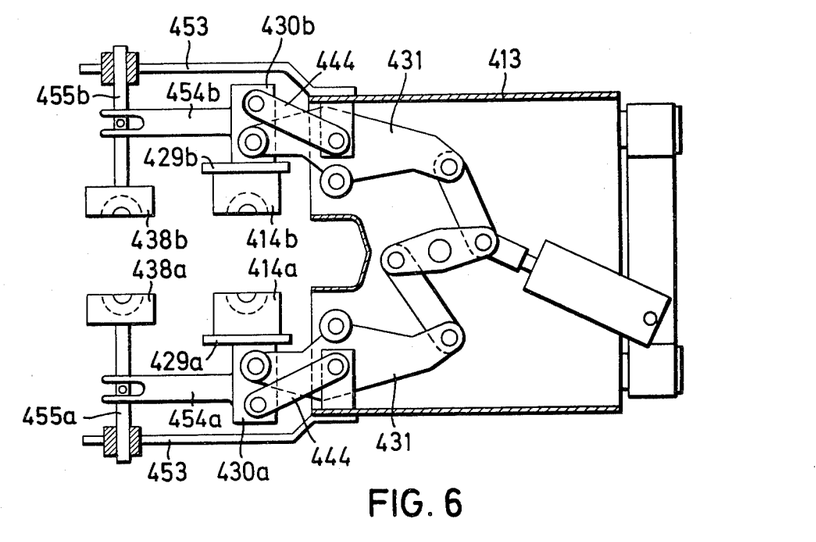

The parts of the arrangement according to FIG. 6 for bringing about the opening and closing movements of the hollow mould halves 414a, 414b and thus guiding the latter correspond to those of the embodiment according to FIG. 5. Fixed support members 453 are provided for the gripper parts 438a, 438b on the carriage 413. The projections 430a, 430b located on the clamping plates 429a, 429b are provided with additional coupling members 454a, 454b, which engage holders 455a, 455b supporting the gripper parts 438a, 438b. By means of these coupling members the closing and opening movements of the hollow mould halves 414a, 414b are also transmitted to the gripper parts 438a, 438b.

Figure 7:
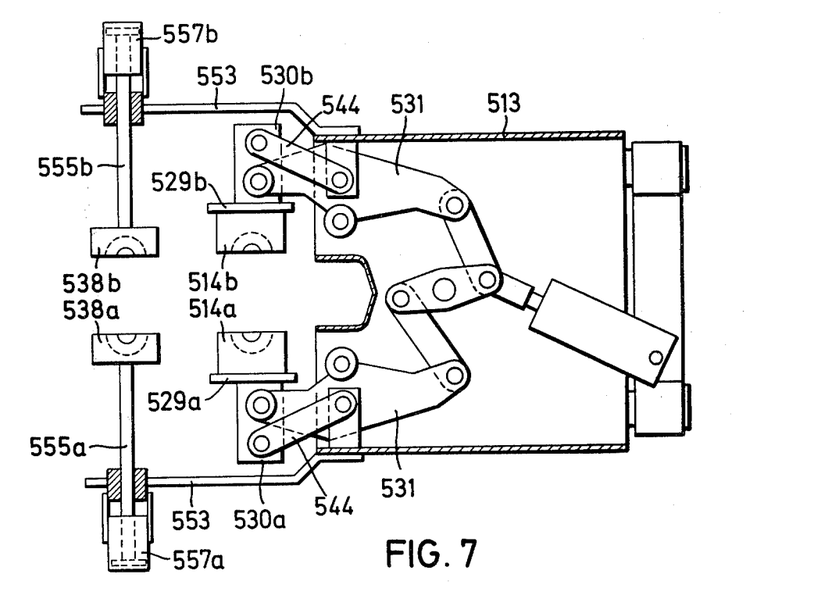

The embodiment according to FIG. 7 corresponds in its basic construction with that according to FIG. 6. However, the coupling members are missing. In place of the latter, the opening and closing movements of the gripper parts are brought about by hydraulic or pneumatic cylinder-piston arrangements 557a, 557b. The latter may be supported by guides 553 or secured in some other appropriate manner.

Figure 8:
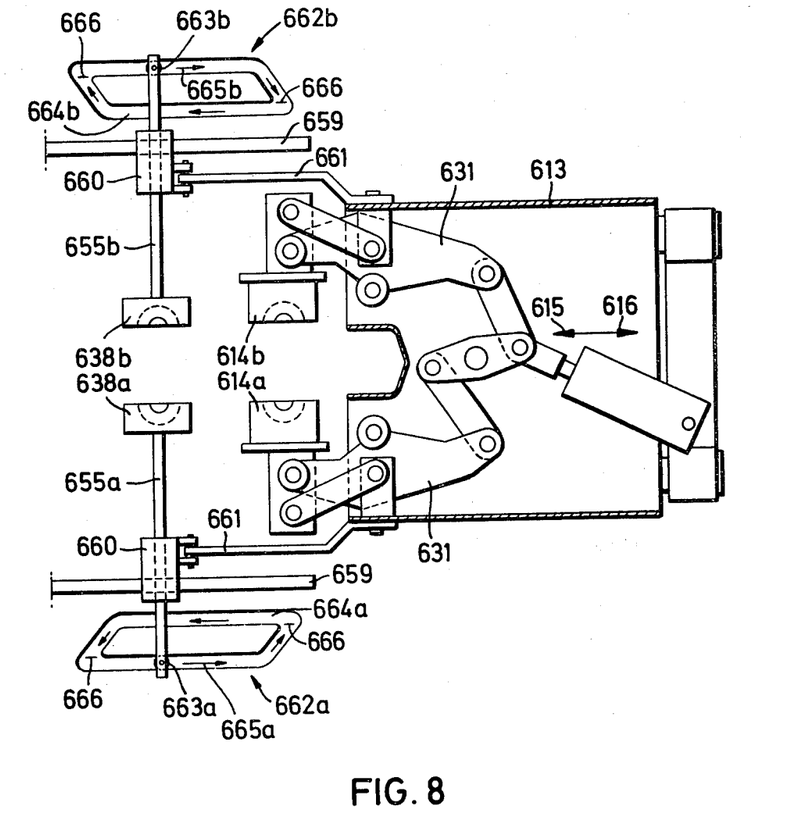

In the embodiment according to FIG. 8, separate stationary guides 659 are provided for the gripper parts 638a, 638b, which guides are arranged independently of the carriages 613 supporting the hollow mould halves 614a, 614b. Carriages 660 are mounted to move to and fro on these guides 659, which carriages in turn have guides for the holders 655a, 655b supporting the gripper parts 638a, 638b. In the course of the opening and closing movements of the gripper parts 638a, 638b, the holders 655a, 655b are moved at right angles to the longitudinal guides 659.

The reciprocating motion of the gripper taking place in the direction of arrows 615 and 616 between the mould release station in which the finished hollow body is received and the transfer station in which the gripper releases the hollow body is transmitted by the carriage 613 to the gripper. For this purpose, guide rods 661 are provided which produce the connection between the carriage 613 and the gripper parts.

The opening and closing movements are transmitted by a cam 622a, 622b to the gripper parts 638a, 638b respectively. For this purpose, the holders 655a, 655b are provided at their ends remote from the gripper parts with rollers 663a, 663b or the like which engage in the respectively associated cam. During passage over the cam section 664a, 664b, the gripper is closed. In the open position of the gripper parts 638a, 638b, the cam section 665a, 665b are traversed. At the transition points between both cam sections, stops 666 are located which allow the rollers 663a, 663b to pass solely in the direction of the arrows. The particular advantage of the embodiment according to FIG. 8 consists in that the reciprocating movements in the direction of arrows 615, 616 carried out by the grippers 638a, 638b do not have to coincide unconditionally with the corresponding movements of the carriage 613 and the hollow mould supported by the latter. On the contrary, owing to the pivotable mounting of the parts 661 producing the connection between the carriage 613 and grippers 638a, 638b, it is possible, for example, to allow the grippers to carry out linear movements, whereas the hollow mould carries out circular movements. It is also possible to allow the grippers 638a, 638b to carry out movements in a horizontal plane, whereas the hollow mould is moved to and fro at an angle to the horizontal. In any case, due to this the area in which the movements of all parts takes place, may be reduced and in particular in the horizontal and/or the vertical planes. Moreover, the embodiment according to FIG. 8 is particularly suitable when only a small distance is necessary for the closing and opening movements of the gripper. This is true for example if the gripper parts 638a, 638b solely grip the neck of a bottle which generally has a small diameter.

Figure 9:
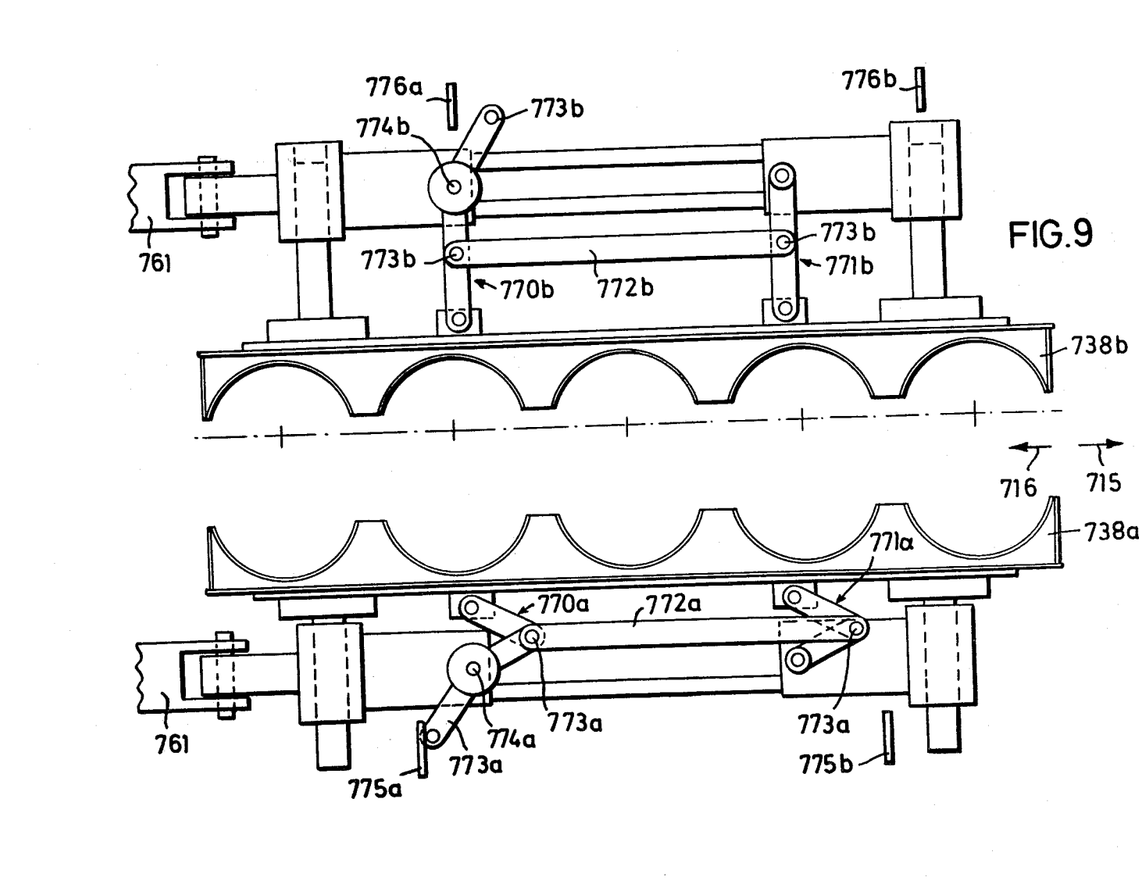

The embodiment according to FIG. 9 corresponds in its basic construction to that according to FIG. 8. The two gripper parts 738a, 738b are guided independently of the hollow mould and its support members which are not shown in the drawing. In this case the movements between the individual stations in the direction of arrows 715, 716 are likewise transmitted by guide rods 761. Consequently, the advantages described for the embodiment according to FIG. 8 are obtained, in particular the possibility of choosing a movement for the gripper which is different from that of the hollow mould.

The opening and closing movements are transmitted to the two gripper parts 738a, 738b by elbow levers. A pair of elbow levers 770a and 771a or 770b and 771b is associated with each gripper part. In this case gripper parts 738a and the associated elbow levers 770a, 771a are shown in the open position and the gripper part 738b with associated elbow levers 770b, 771b are shown in the closed position. The elbow levers 770a, 771a or 770b, 771b of each gripper part are connected to each other by a cross-bar 772a, 772b. At the joints 773a, 773b of the elbow levers the cross-bars engage the latter. The actuation of the elbow levers is effected by radial arms 773a, 773b, which, at pivot points 774a, 774b of an elbow lever which does not alter its position, engage the arm of the elbow lever mounted at this point so that it does not rotate. These arms co-operate with stops 775a, 775b and 776a, 776b, which are associated with the end positions of the gripper 738a, 738b with respect to the reciprocating movements in the direction of arrows 715 and 716.

Although, due to the different positions in which the two gripper parts 738a, 738b are shown in the drawing, a clear definition of the position of the gripper with respect to the reciprocating movement in the direction of arrows 715, 716 is not possible, FIG. 9 shows that the closing and opening movements of the gripper parts 738a, 738b are achieved in that the arms 773a, 773b strike against the stops 775a, 775b or 776a, 776b during the closing stage of the movements and the resulting tilting of these arms is transmitted to the gripper parts by a corresponding actuation of the elbow levers 770a, 771a and 770b, 771b. In this case it is also true that the same drive system is used for the grippers and the hollow mould.

Separate guides, similar to the guides 659 of FIG. 8, independent of the hollow mould and the parts supporting it are provided for the grippers 738a, 738b. The stops 775a, 775b and 776a, 776b may be supported by these guides not shown in FIG. 9.

In contrast to the embodiments of FIGS. 1 to 8, FIG. 9 shows a gripper which is suitable for receiving five hollow bodies simultaneously. The associated hollow mould will also be provided with a corresponding number of moulding pockets.

In the aforedescribed embodiments it is assumed that the blowing and calibrating member is associated with the mould release station so that the blowing up of the pre-form to form the finished hollow body also takes place in this station.

Naturally, other constructions are possible, for example the blowing member or other part necessary for the supply of pressure medium may follow the reciprocating movement of the hollow mould between the receiving station and the mould release station. In this case, in the mould release station a separate holder for the or each hollow body is provided in order to guarantee its position until it is gripped by the gripper. This is also true if the part located in the mould release station for the supply of the pressure medium is constructed such that it cannot support the hollow body. This could be the case, for example, with a needle through which the pressure medium is supplied.

What is claimed is:

1. Apparatus for the manufacture of blow-moulded, hollow bodies from thermoplastic synthetic material which transfers the hollow bodies during stages of manufacture between a receiving station which includes an extruder having an extrusion nozzle; a blow-mould and mould-release station having a holder; and a transfer station which transfers the hollow bodies away from the apparatus including:
   a hollow mould having at least two parts which receive thermoplastic material from the extrusion nozzle;
   a means connected to support each of the hollow mould parts;
   a gripper to temporarily hold the hollow bodies;
   a lever arm means to which the gripper is mounted and further to which the means supporting the hollow mould parts are attached such that the lever arm means operates to open and close the hollow mould parts and open and close the gripper;
   means connected to actuate the lever arm means;
   an automatically displaceable carriage;
   means connected to displace the carriage wherein;
   the lever arm means is connected to the carriage such that the means supporting the hollow mould parts is displaceable between the receiving station at which the hollow mould is closed and the mould release station at which the hollow mould is opened and the hollow bodies are removed from the hollow mould parts, and wherein the lever arm means is connected such that the gripper is displaceable between the mould release station at which the gripper closes to hold the hollow bodies and the transfer station at which the gripper opens to release the hollow body, wherein;
   during the displacement of the hollow mould parts from the receiving station to the mould-release station, the gripper is correspondingly moved from the mould-release station to the transfer station; and wherein the mould-release station holder supports the hollow bodies after the hollow mould parts are opened at the mould-release station.

2. Apparatus according to claim 1, in which the lever arm means serve for guiding the hollow mould parts in alignment relative to each other.

3. Apparatus according to claim 1 in which the gripper is rigidly attached to the lever arm means.

4. Apparatus according to claim 1 in which the gripper is pivotably mounted on the lever arm means.

5. Apparatus according to claim 1, in which the holder is a blowing and calibrating member.

6. Apparatus according to claim 1, wherein said lever arm means includes a pair of arm members at the free end of which a gripper is connected and a pair of link members, one for each arm member, for pivotably connecting the arm members to respective ones of the means supporting the mould parts.

7. Apparatus according to claim 6 in which the arms are connected to each other forming a common pivot point.

8. Apparatus according to claim 1 wherein said lever arm means is pivotably connected to the carriage.

9. Apparatus according to claim 8 wherein the connection of said lever arm means to said carriage is independent of the coupling of said lever arm means with said means supporting the mould parts.

10. Apparatus for the manufacture of blow-moulded, hollow bodies from thermoplastic synthetic material which transfers the hollow bodies during stages of manufacture between a receiving station which includes an extruder having an extrusion nozzle; a blow-mould and mould-release station having a holder; and a transfer station which transfers the hollow bodies away from the apparatus including:
- a hollow mould having at least two parts which receive thermoplastic material from the extrusion nozzle;
- a means connected to support each of the hollow mould parts;
- an automatically displaceable carriage;
- means connected to displace the carriage;
- means mounted to the carriage for supporting the means connected to support the mould parts and for guiding the mould parts for opening and closing movement relative to each other;
- parts forming a gripper;
- arm means to which the parts forming the gripper are mounted, said arm means being connected to said carriage for guiding the parts forming the gripper for opening and closing movement relative to each other;
- said means mounted to the carriage for supporting the mould parts and the means supporting the mould parts for movement between the receiving station and the mould release station, at which the hollow bodies are removed from the mould parts;
- said arm means mounted to the parts forming the gripper for movement between the mould release station at which the hollow bodies are received by the parts forming the gripper; and the transfer station at which the hollow bodies are received from the parts forming the gripper;
- such that during movement of the mould from the receiving station to the release station the parts forming the gripper are correspondingly moved from the release station to the transfer station; and
- wherein the mould-release station holder supports the hollow bodies after removal from the hollow mould parts at the mould-release station, and wherein;
- the arm means includes a separate arm member for each part forming the gripper, and wherein the apparatus further comprises:
- a separate guide means for each arm member, said arm members being connected to their respective guide means for guiding the parts forming the gripper for opening and closing movement relative to each other and during movement of the parts forming the gripper from the release station to the transfer station.

11. Apparatus according to claim 10 further including a further carriage which connects the arm means supporting the parts forming the gripper to the carriage.

12. Apparatus according to claim 11, in which lever arm means are pivotably connected to the carriage.

13. Apparatus according to claim 10, in which stops are provided in the region of the end positions of the parts forming the gripper, which stops cooperate with control means pivotally mounted to the arm means and operatively associated with the parts forming the gripper, which control means move the parts forming the gripper into the open or closed position depending on the sequence of movements between the mould release station and the transfer station.

14. Apparatus according to claim 13, in which the control means include elbow levers and a control part which is actuated by the stops, with one of the elbow levers being respectively connected to the control part.

15. Apparatus according to claim 10, wherein the guide means are linear.

16. Apparatus according to claim 10 wherein the connection of said arm means to said carriage is independent of the coupling of said arm means with said means connected to support the mould parts.

* * * * *